United States Patent
Imai et al.

(10) Patent No.: US 6,910,130 B2
(45) Date of Patent: Jun. 21, 2005

(54) SYSTEM FOR AND METHOD OF UNCONDITIONALLY SECURE DIGITAL SIGNATURE

(75) Inventors: Hideki Imai, 557-44-205 Sinanomachi, Totuka-ku, Yokohama-shi, Kanagawa 224-0801 (JP); Goichiro Hanaoka, Tokyo (JP); Junji Shikata, Tokyo (JP); Yuliang Zheng, Melbourne (AU)

(73) Assignee: Hideki Imai, Yokohama (JP)

( * ) Notice: Subject to any disclaimer, the term of this patent is extended or adjusted under 35 U.S.C. 154(b) by 908 days.

(21) Appl. No.: 09/725,272

(22) Filed: Nov. 29, 2000

(65) Prior Publication Data

US 2002/0095581 A1 Jul. 18, 2002

(51) Int. Cl.[7] .................................................. H04L 9/00
(52) U.S. Cl. ........................ 713/180; 713/175; 713/176; 713/162
(58) Field of Search ................................ 713/162, 168, 713/180, 175–176

(56) References Cited

U.S. PATENT DOCUMENTS

| | | | | |
|---|---|---|---|---|
| 5,202,921 A | * | 4/1993 | Herzberg et al. | ........... 713/162 |
| 6,076,163 A | * | 6/2000 | Hoffstein et al. | ........... 713/168 |
| 6,154,841 A | * | 11/2000 | Oishi | ........... 713/180 |
| 6,446,206 B1 | * | 9/2002 | Feldbaum | ........... 713/175 |
| 6,671,805 B1 | * | 12/2003 | Brown et al. | ........... 713/176 |
| 2001/0005823 A1 | * | 6/2001 | Fischer et al. | ........... 704/205 |

* cited by examiner

*Primary Examiner*—Andrew Caldwell
*Assistant Examiner*—Minh Dieu Nguyen
(74) *Attorney, Agent, or Firm*—McGinn & Gibb, PLLC

(57) ABSTRACT

A digital signature system comprises a center computer and a first and second terminal devices which can communicate with each other. The center computer generates and outputs a signing-key for a signer and a verification-key for a verifier. The first terminal device accepts the signing-key, generates a digital signature for a digital data to be signed using the signing-key, and outputs the digital signature. The second terminal device accepts the verification-key, the signer's identification code (e.g. the unique code of the signer), an identification code of the digital data and the digital signature, and verifies the validity of the digital signature using the verification-key, the identification code of the digital data and the signer's identification code.

21 Claims, 7 Drawing Sheets

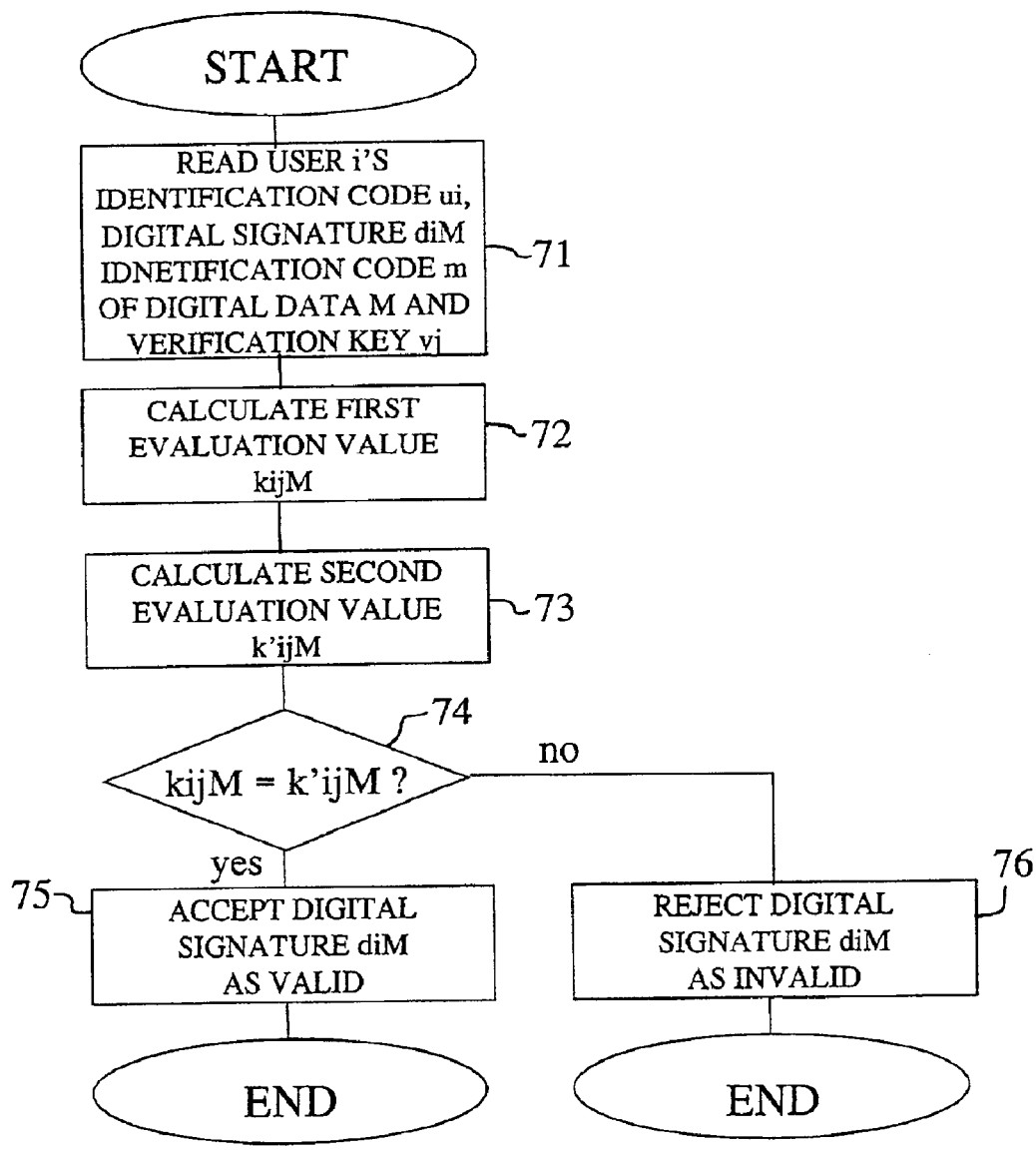

SYSTEM FOR AND METHOD OF UNCONDITIONALLY SECURE DIGITAL SIGNATURE

BACKGROUND OF THE INVENTION

1. Field of the Invention

The present invention relates to a system for and of unconditionally secure signature, more specifically to a digital signature system, a computer and a terminal device used in the digital signature system, a method of establishing a signing-key, a verification-key and a digital signature, a method of verifying a digital signature.

2. Description of the Background Art

In recent years, digital signatures are used as proof of authorship of, or at least agreement with, digital data.

While some data may only require the assurance of integrity for a relatively short period of time (say up to 5 years), some other important data, such as court records and speeches by a parliamentarian, require the assurance of integrity for a long period of time (say up to 50 years).

Currently, digital signature schemes based on the number theoretic problems are the prevalent methods used in providing data integrity. These schemes rely for their security on the assumed computational difficulty of computing certain number theoretic problems, such as factoring large composites or solving discrete logarithms in a large finite field. Progress in computers as well as further refinement of various algorithms has made it possible to solve the number theoretic problems of larger sizes. As an example, in August 1999, a team of researchers from around the world succeeded in cracking a 512-bit RSA composite by the use of the Number Field Sieve over the Internet. One can safely predict that even larger composites will be factored in the future.

The above discussions indicate the necessity of digital signature schemes that provide assurance of long term integrity. In the past decade, several attempts by various researchers have been made to address the problem. However, schemes proposed by these researchers are essentially variants of authentication codes, and none of these schemes has addressed the transferability of signatures among recipients.

Besides this, it is desired that a user's public key is based on the identity of the user so that other users do not need to verify the validity of the relationship between a public key and an owner.

SUMMARY OF THE INVENTION

An object of the present invention is to realize a digital signature system that admits transferability, and provable security against all of known attacks (impersonation, substitution, and transfer with a trap), based on no computationally hard problem.

Still further object of the present invention is to make a public key of a user in the digital signature system be associated with the user's unique identity, such as the user s name.

A digital signature system, according to the present invention, comprises a center computer and a first and second terminal devices which can communicate with each other. The center computer generates and outputs a signing-key to be inputted in the first terminal device, and generates and outputs a verification-key to be inputted in the second terminal device. The first terminal device accepts the first signing-key, generates a digital signature for a digital data to be signed using the signing-key, and outputs the digital signature to be inputted in the second terminal device. The second terminal device inputs the verification-key, a signer's identification code (e.g. the unique code of a signer), the digital data and the digital signature, and verifies the validity of the digital signature using the verification-key, the digital data and the signer's identification code The center computer, the first and second terminal devices communicate with each other through a medium including not only a network (inclusive of wired, wireless, satellite communication, the Internet and other public or dedicated network) but also a portable media such as a floppy disk, an MO disk, or the like.

Accordingly, the center computer may transmit through the network the signing-key to the first terminal device and may through the network transmit the verification-key to the second terminal device. The first terminal device may transmit through the network the digital signature, the digital data and the signer's identity (e.g. the name of the signer) to the second terminal device.

Alternatively, the signing-key which is generated in the center computer may be stored in a portable medium such as an FD, an MO, or the like. The portable medium is mounted on the first terminal device, and the signing-key is read in the first terminal device.

The verification-key which is generated in the center computer may be stored in a portable medium such as an FD, an MO, or the like. The portable medium is mounted on the second terminal device, and the verification-key is read in the second terminal device.

The digital data and the digital signature which is outputted from the first terminal device may be stored in a portable medium such as an FD, an MO, or the like. The portable medium is mounted on the second terminal device, and the digital data and the digital signature are read in the second terminal device.

The signer's identification code may be transmitted from the first terminal device to the second terminal device. The signer's identity may be written on the FD on which the digital signature is recorded. A verifier reads the signer's identity and inputs the signer's identification code which represents the signer's identity into the second terminal device.

According to the invention, since the center directly delivers the verification-key to the verifier, differently from a conventional construction of digital signature system, the verifier and the center can make the verification-key be secret to other entities including the signer. Hence, though in the conventional construction of digital signature system there exist no digital signature system with unconditional security against all known attacks (substitution attack, impersonation attack and transfer with a trap attack), by this invention, a digital signature system with unconditional security against all known attacks can be realized, as described later.

A center computer, according to the present invention, comprises first generating means for generating a signing-key for a signer (which is to be inputted in the first terminal device), second generating means for generating a verification-key for a verifier (which is to be inputted in the second terminal device), a first output device outputting the signing-key generated by the first generating means and a second output device outputting the verification-key generated by the second generating means.

According to this invention, the above digital signature system can be constructed using the center computer.

A first terminal device, according to the present invention, comprises an accepting means for accepting a signing-key, a first input device inputting the signing-key, a second input device inputting an identification code of a digital data, a generating means for generating a digital signature and an output device outputting a digital signature.

As the identification code of the digital data, the digital data itself, a hashed value of the digital data using a hash function or the like can be used.

According to this invention, the above digital signature system can be constructed using the first terminal device.

A second terminal device, according to the present invention, comprises a first accepting means for a verification-key, a first input device inputting a verification-key, a second accepting means for a digital signature, a second input device inputting the digital signature, a third accepting means for a digital data, a third input device inputting the identification code of the digital data. A fourth accepting means for a signer's identity, a fourth input device inputting the signer's identification code and a verifying means for verifying the validity of the digital signature using the verification-key, the signer's identification code and the identification code of the digital data.

According to this invention, the above digital signature system can be constructed using the second terminal.

In a center computer, a method of establishing a signing-key and a verification-key according to the present invention comprises the steps of: generating a first multivariate function, generating a second multivariate function obtained by substituting a signer's identification code into a first variable of the first multivariate function, outputting the second multivariate function as a signing-key for the signer, generating a random number, a third multivariate function obtained by substituting the random number to a second variable of the first multivariate function, and outputting the random number and the third multivariate function as a verification-key for the verifier.

According to this invention, the above method is not always based on a computationally hard problem so that a digital signature system can be constructed with unconditional security.

After establishing a signing-key and a verification-key according to the present invention, the signing-key is distributed to the signer, and the verification-key is distributed to the verifier.

When the signer wants to generate a digital signature in the first terminal device, a method of establishing a digital signature according to the present invention comprises the steps: generating a fourth multivariate function obtained by substituting an identification code of the digital data into the third variable of the second multivariate function, and outputting the fourth multivariate function as a digital signature.

According to this invention, the above method is not always based on a computationally hard problem so that a digital signature system can be constructed with unconditional security.

When the verifier accepts the digital signature in the second terminal device, the validity of the digital signature is verified using a method which is according to the present invention comprising the steps of: generating a first evaluation value by substituting the random number into the second variable of the fourth multivariate function, generating a second value by substituting the signer's identification code and the identification code of the digital data into the first and third variables of the third multivariate function, respectively, and accepting the digital signature as valid if both of the first and second evaluation values equal, and otherwise rejecting the digital signature as invalid.

According to this invention, the above method is not always based on a computationally hard problem so that a digital signature system can be constructed with unconditional security. Furthermore, according to this invention, since the signer's identification code is used as a public key of the signer, the verifier does not need to verify the validity of the public key of the signer.

Although the methods of: establishing a signing-key and a verification-key by the center computer; establishing a digital signature by the first terminal device; and verifying the validity of the digital signature by the second terminal device are presented in the above, computers readable recording medium having a program recorded thereon, the program controlling computers so as to execute the same procedures as described above may also be utilized.

More explicit construction of a digital signature system with unconditional security is described in the embodiment by using multivariate polynomials over a finite field as the multivariate functions in the above construction method.

A multivariate polynomial over a finite field is used for the first, second, third and fourth multivariate function according to the above methods of establishing a signing-key, a verification-key and a digital signature.

According to the present invention, since the method for constructing a digital signature system is based on the randomness of multivariate polynomials over a finite field, a digital signature system which is based on no computationally hard problem can be realized.

A multivariate polynomial is generated uniformly at random from the finite field for generating the first multivariate function, according the above method in which a multivariate polynomial over a finite field is used for the first multivariate function.

According to the present invention, since the randomness of multivariate polynomials over a finite field can be significantly enhanced, the security of a digital signature system can be also enhanced.

The maximum degree of the first variable in the multivariate polynomial over the finite field is taken more than or equal to n−1, where n is the number of signers, according to the above method in which a multivariate polynomial is generated uniformly at random from the finite field for generating the first multivariate function.

According to the present invention, by an information theoretic analysis, a digital signature system with unconditional security which allows n signers to generate signatures can be realized.

The number of variables of the second group of variables in the multivariate polynomial over the finite field is taken more than or equal to a pre-defined number of colluders among verifiers, according to the above method in which a multivariate polynomial is generated uniformly at random from the finite field for generating the first multivariate function.

According to the present invention, by an information theoretic analysis, a digital signature system with unconditional security which is secure even if there exists the pre-defined number of colluders among verifiers.

The maximum degree of the third variable in the multivariate polynomial over the finite field is taken more than or equal to a pre-defined number up to which each signer is allowed to generate digital signatures, according to the above method in which a multivariate polynomial uniformly at random from the finite field for generating the first multivariate function.

According to the present invention, by an information theoretic analysis, a digital signature system with unconditional security which allows each signer to generate up to the pre-defined number of digital signatures.

A compressed data or an encoded data of a digital data by a hash function is used for an identification code of a digital signature according the above digital signature system.

According to this invention, since an identification code of any digital data can be represented by an element of a finite field which is used for the digital signature system, a signer can generate a signature for any digital data. However, in this case, the security of the digital signature system is based on the underlying hash function.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows an outline of a signing-key generation program (1), and FIG. 4 shows an outline of the signing-key generation program (2);

FIG. 7 illustrates a flow chart showing the flow of processing of the verification of the digital signature in the second terminal device.

DESCRIPTION OF THE PREFERRED EMBODIMENTS

A digital signature system is a system in which a user generates digital signatures for any types of digital data (digital image, digital document, digital sound), and a user determines who generated a digital signature.

In the digital signature system according to the present embodiment, a center is set up, and a user, who wants to generate or verify a digital signature in the digital signature system, requests the center to issue a qualification that allows the user to generate or verify a signature, respectively. A user, who has qualification that allows the user to generate a digital signature, is called a signer. A user, who has qualification that allows the user to verify a digital signature, is called a verifier. A user can be given a qualification to use the digital signature system if the user is identified, for example, by showing the user's identification card. In the digital signature system, each signer has an identification code which is an element of a finite field $GF(q)$ with q elements. Each user's identification code is publicly known to all other users.

Figure 1:
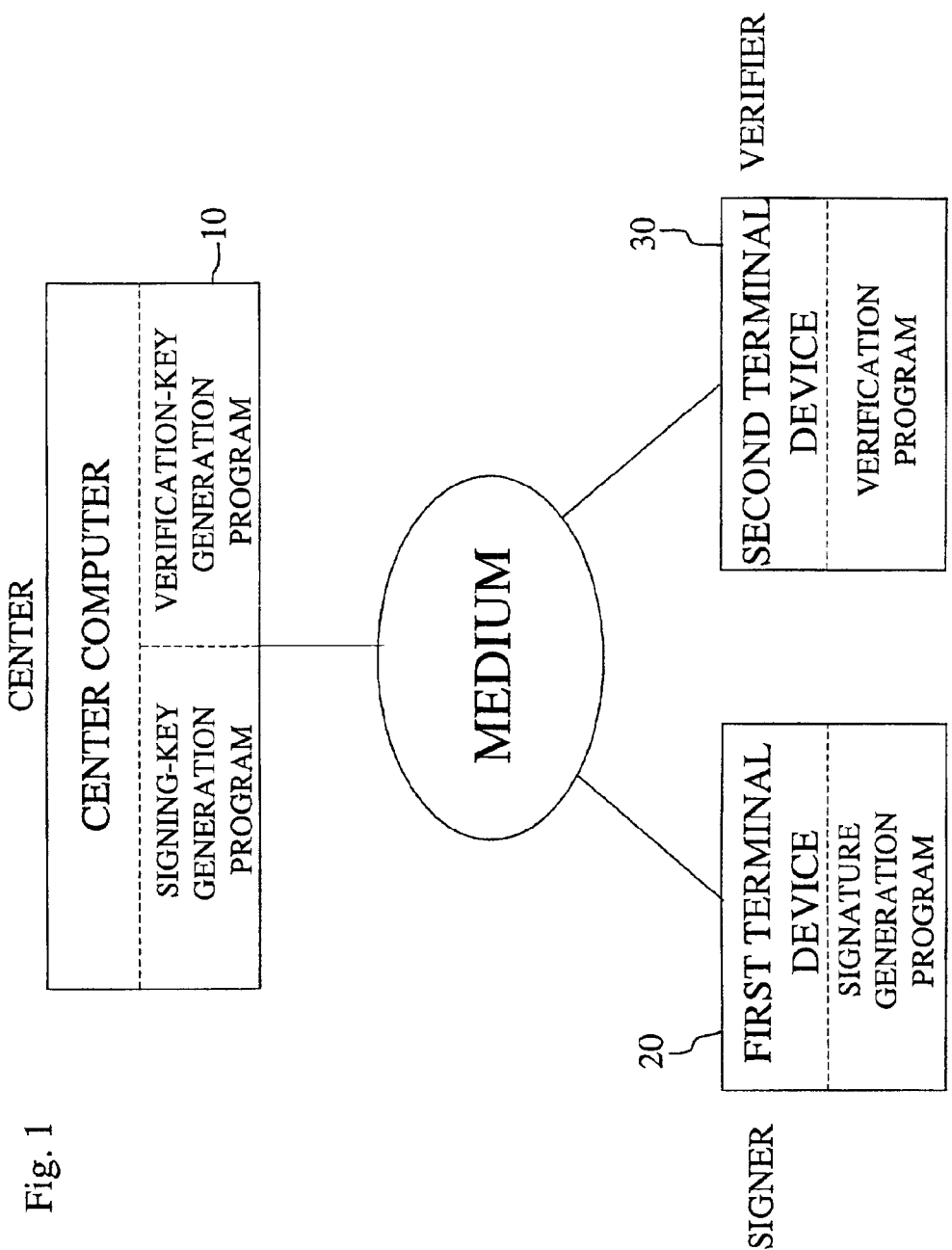
FIG. 1 illustrates the overall configuration of a digital signature system according to an embodiment.

FIG. 1 illustrates the configuration of a digital signature system according to the first embodiment.

The digital signature system includes a center computer 10, a plurality of first terminal devices 20 and a plurality of second terminal devices, which can be communicate with each other through a medium including not only a network (inclusive of wired, wireless, satellite communication, the Internet and other public or dedicated network) but also a portable media such as a floppy disk, an MO disk, or the like. In the present embodiment, the center computer shall be under the management of a center. The first terminal device shall be under the management of a signer who generates a signature in the digital signature system. The second terminal device shall be under the management of a verifier who verifies a signature in the digital signature system. One terminal device 20 and one terminal device 30 are illustrated for convenience.

Figure 3:
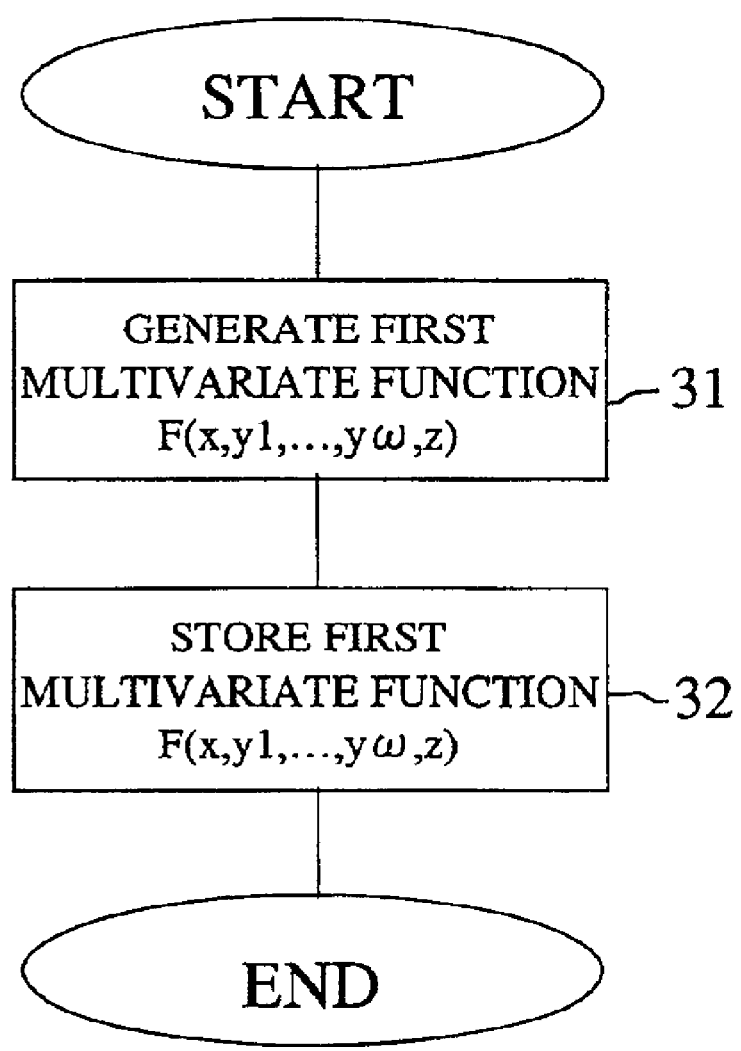
FIGS. 3 and 4 illustrate flow charts showing the flow of processing of the generation of the signing-key si in the center computer.
Figure 4:
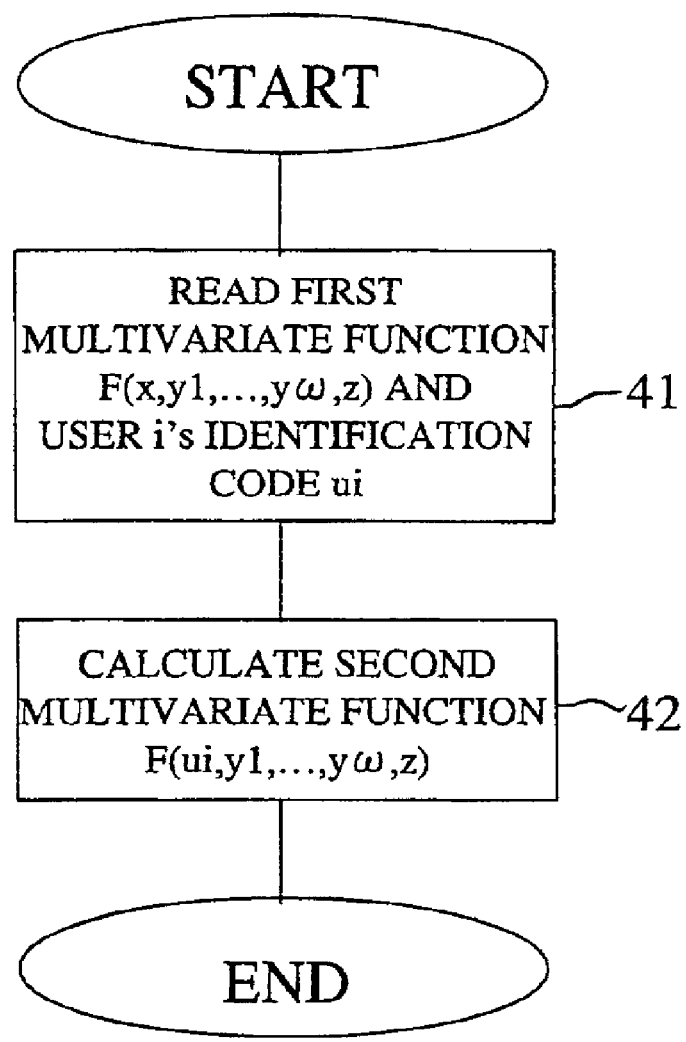

The center computer 10 has a signing-key generation program (including a signing-key generation program (1) shown in FIG. 3 and a signing-key generation program (2) shown in FIG. 4) and a verification-key generation program (including a verification-key generation program shown in FIG. 5) installed therein. The center computer 10 includes, of course, an input device such as a keyboard, a mouse and so on, and output device such as a display device, a storage device (a semiconductor memory, a hard disk, or the like), and a communication device.

The first terminal device 20 and the second terminal device 30 are also realized by a computer, e.g. a personal computer. The first terminal device 20 has a signature generation program (including a signature generation program shown in FIG. 6), and the second terminal device 30 has a verification program (including a verification program shown in FIG. 7). The terminal devices 20 and 30 include an input device such as a keyboard, a mouse and so on, and output device such as a display device, a storage device (a semiconductor memory, a hard disk), and a communication device.

Figure 2:
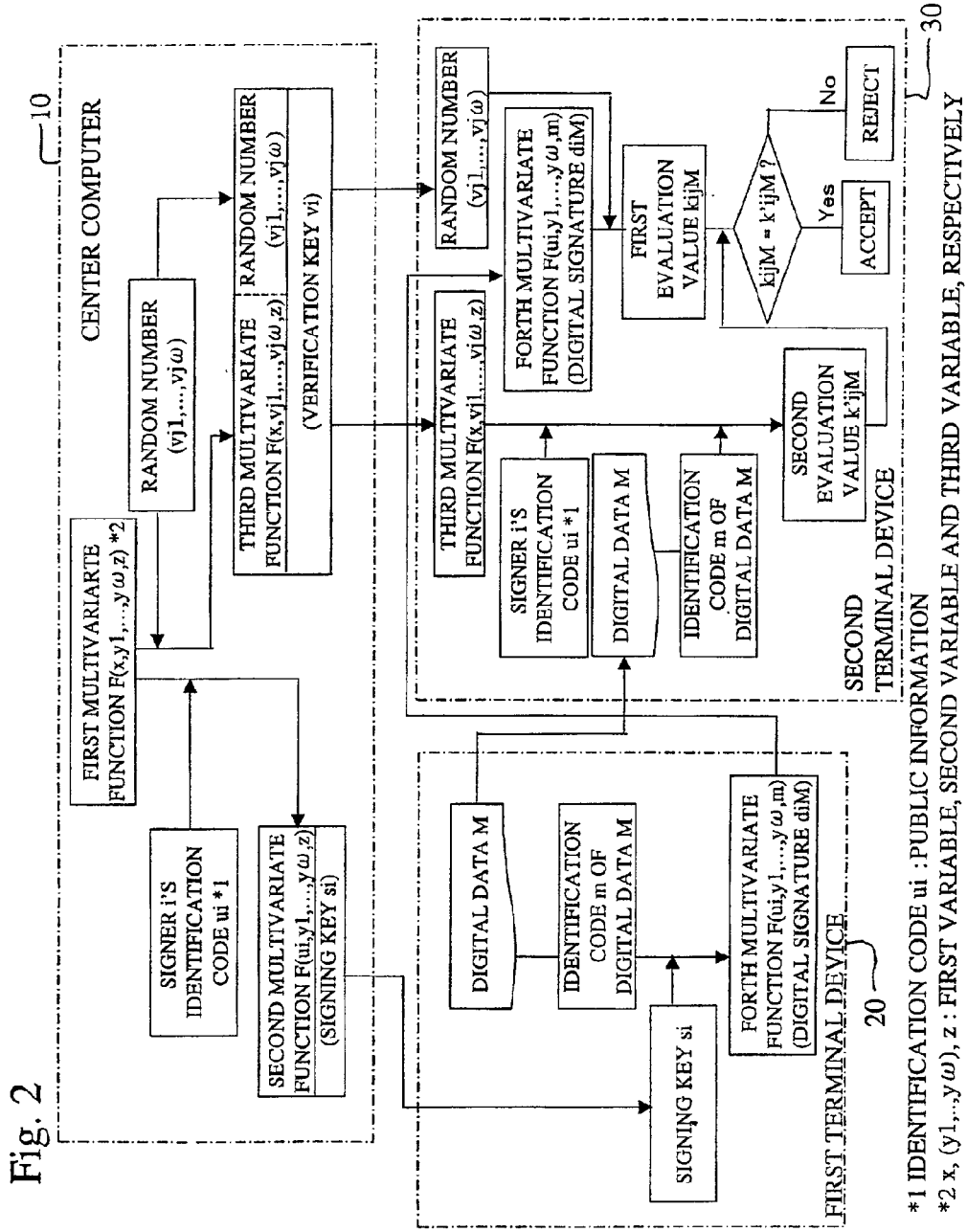
FIG. 2 illustrates a center computer, a first terminal device and a second terminal device from the viewpoint of generating a signing-key with respect to the center computer, from the viewpoint of generating a verification-key with respect to the center computer, from the viewpoint of generating a digital signature with respect to the first terminal device and from the viewpoint of verifying a digital signature with respect to the second terminal device.

With reference to FIG. 2, in the center computer 10, a first multivariate function $F(x, y1, \ldots, y\omega, z)$, described later, is generated, where x is a first variable, $(y1, \ldots, y\omega)$ is a second variable and z is a third variable. For each of signers $i$ $(i=1, \ldots, n)$, a second multivariate function, described later, is generated as an inherent signing-key si in the center computer 10 using the first multivariate function $F(x, y1, \ldots, y\omega, z)$ and the signer's identification code ui. Further, by using the first multivariate function $F(x, y1, \ldots, y\omega, z)$ and a random number $(vj1, \ldots, vj\omega)$, for each of verifiers j $(j=1, \ldots, n)$, a third multivariate function and the random number $(vj1, \ldots, vj\omega)$ are generated as an inherent verification-key vj, described later, in the center computer 10.

The signing-keys si are distributed, respectively, to the signer i. The verification-keys vj are distributed, respectively, to the verifier j. The signing-key si and verification-key vj are delivered to the signer i and the verifier j, respectively, by a secure channel, for example, such as mail (mailing a floppy disk having the signing-key si and verification-key vi recorded thereon, etc.), in writing (a letter, a facsimile, etc.), or the like.

The first terminal device 20 reads the signing-key si and an identification code m of a digital data M for which the signer wants to sign, and outputs a digital signature diM, as described later. As the identification code m of the digital data M, the digital data M itself, a hashed value of the digital data M using a hash function or the like can be used.

The signer i sends the signer i's identity, the digital data M and the digital signature diM to a verifier though a medium including not only a network (inclusive of wired, wireless satellite communication, the Internet and other public or dedicated network) but also a portable media such as a floppy disk, an MO disk, or the like.

On receiving the signer i's identity, the digital data M and the digital signature diM, the verification-key vj, the signer i's identification code ui, the identification code m of the digital data M and the digital signature diM are inputted to the second terminal device 30 which is controlled by a verifier j, who wants to determine the validity of the digital signature diM, and the second terminal device 30 calculates a first evaluation value kijM, which is calculated from the digital signature diM and the random number $(vj1, \ldots, vj\omega)$, and a second evaluation value k'ijM, which is calculated from the signer i's identification code ui, the identification code m of the digital data M and the third multivariate function. If the first evaluation value kijM is equal to the second evaluation value k'ijM, the digital signature diM is accepted as a valid digital signature. A verifier, who receives the signer i's identity, the identification code m of the digital data M and the digital signature diM, may further transfer the signer i's identity, the identification code m of the digital data M and the digital signature diM to another verifier though a medium including not only a network (inclusive of wired, wireless, satellite communication, the Internet and other public or dedicated network) but also a portable media such as a floppy disk, an MO disk, or the like.

FIGS. 3 and 4 illustrate flow charts showing the flow of processing of the generation of the signing-key si. FIG. 3 shows and outline of a signing-key generation program (1), and FIG. 4 shows an outline of the signing-key generation program (2).

With reference to FIG. 3, description is first made of the flow of generating the first multivariate function $F(x, y1, \ldots, y\omega, z)$ in the center computer 10. The center computer 10 generates a plurality of random numbers a_fgh $(f=0, \ldots, n-1, g=0, \ldots, \omega, h=0, \ldots, \psi)$ over a finite field GF(q) with q elements, where n is the total number of signers, $\omega$ is the maximum number of colluders (bad users who try to forge a digital signature illegally) among all verifiers, and $\psi$ is the maximum number of signatures which are allowed to generate per a signer. As an example, a random number generator program can be used for the generation of a_fgh $(f=0, \ldots, n-1, g=0, \ldots, \omega, h=0, \ldots, \psi)$. By using a_fgh $(f=0, \ldots, n-1, g=0, \ldots, \omega, h=0, \ldots, \psi)$ as coefficients, the first multivariate function $F(x, y1, \ldots, y\omega, z)$ can be generated to be the following polynomial over the finite field GF(q):

$$F(x, y1, \cdots, y\omega, z) = \sum_{f=0}^{n-1}\sum_{h=0}^{\psi} a\_f0hx^f z^h + \sum_{f=0}^{n-1}\sum_{g=1}^{\omega}\sum_{h=0}^{\psi} a\_fghx^f y_g z^h.$$

(step 31)

The first multivariate function $F(x, y1, \ldots, y\omega, z)$ is stored in the storage device in the center computer 10 (step 32).

With reference to FIG. 4, description is now made of generating the signing-key si. The center computer 10 reads the signer i's identification code and the first multivariate function $F(x, y1, \ldots, y\omega, z)$ which is stored in the storage device in the center computer 10 (step 41). The center computer 10, next, substitutes the first variable x=the identification code ui into the function $F(x, y1, \ldots, y\omega, z)$ to obtain the second multivariate function $F(ui, y1, \ldots, y\omega, z)$ which is the signing-key si and, then, outputs the signing-key si (step 42).

Figure 5:
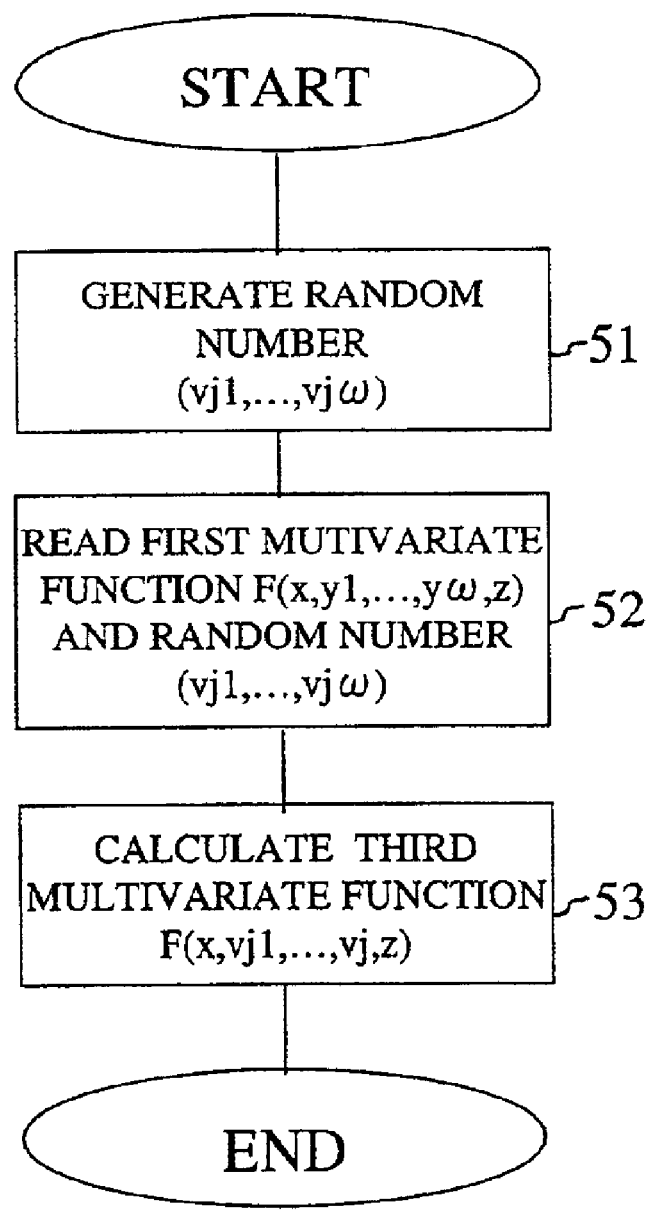
FIG. 5 illustrates a flow chart showing the flow of processing of the generation of the verification-key vi in the center computer.

FIG. 5 illustrates a flow chart showing the flow of processing of the generation of the verification-key vi in the center computer.

Firstly, the center computer 10 generate a random number $(vi1, \ldots, vi\omega)$ uniformly at random from a finite field $GF(q)^\omega$ with $q^\omega$ elements (each of $vi1, \ldots, vi\omega$ is an element of GF(q).) (step 51).

Next, the center computer 10 reads the first multivariate function $F(x, y1, \ldots, y\omega, z)$ from the storage device in the center computer 10 (step 52), and substitutes the second variable $(y1, \ldots, y\omega)$=the random number $(vi1, \ldots, vi\omega)$ into the first multivariate function $F(x, y1, \ldots, y\omega, z)$ to obtain the third multivariate function $F(x, vi1, \ldots, vi\omega, z)$ and $(vi1, \ldots, vi\omega)$ which are the verification-key vi and, then, outputs the verification-key vi (step 53).

Figure 6:
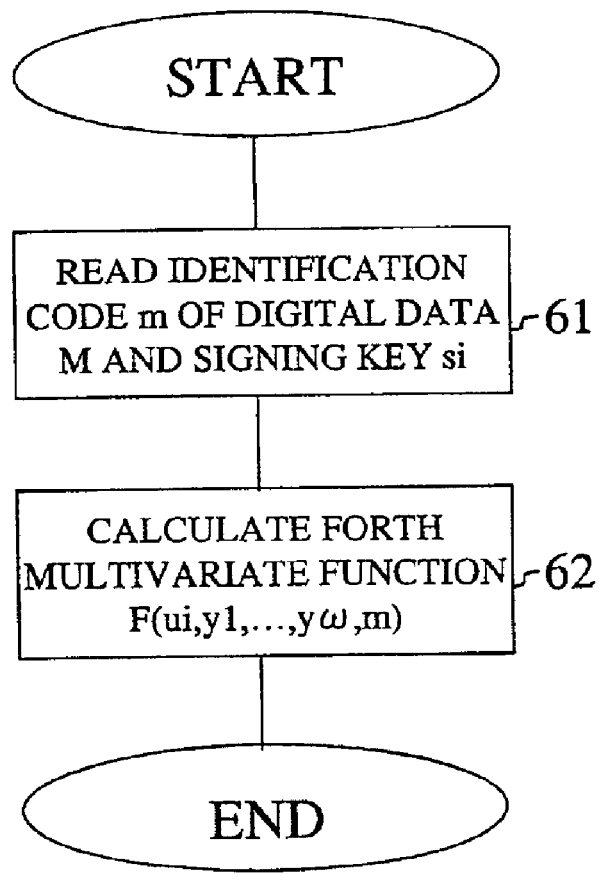
FIG. 6 illustrates a flow chart showing the flow of processing of the generation of a digital signature in the first terminal device.

FIG. 6 illustrates a flow chart showing the flow of processing of the generation of a digital signature diM in the first terminal device 20.

The first terminal device 20 reads the identification code m of the identification code m of digital data M, for which the user i wants to sign, and the signing-key si (from a storage device or an FD, for example) (step 61).

In the digital signature system, the identification code m of the digital data M to be signed is represented to be an element of GF(q). In the digital signature system, as the identification code m of the digital data M, the digital data M itself is used if possible. If a size of a data is too large to be represented to be an element of GF(q), the user may use a hash function to compress the data to be an element of GF(q) to use the hashed value as the data to be signed.

The first terminal device 20, next, substitutes the third variable z=the identification code m of digital data M into the signing-key si to obtain the fourth multivariate function $F(ui, y1, \ldots, y\omega, m)$ which is the digital signature diM and, then output the digital signature diM (step 62).

FIG. 7 illustrates a flow chart showing the flow of processing of the verification of the digital signature diM in the second terminal device 30.

The second terminal device 30, first, reads the signer i's identification code, the identification code m of digital data M, the digital signature diM, and the verification-key vj $(=F(x, vj1, \ldots, vj\omega, z)$ and $(vj1, \ldots, vj\omega))$ (from a storage device or an FD, for example) (step 71). The second terminal device 30, next, substitutes the first variable x=the user i's identification code ui and the third variable z=the identification code m of digital data M into the third multivariate function $F(x, vj1, \ldots, vj\omega, z)$ to obtain the first evaluation value kijM:=$F(ui, vj1, \ldots, vj\omega, m)$ (step 72).

Further, the second terminal device 30 substitutes the second variable $(y1, \ldots, y\omega)$=the random number $(vj1, \ldots, vj\omega)$ into the digital signature diM, to obtain the second evaluation value k'ijM:=$F(ui, vj1, \ldots, vj\omega, m)$ (step 73).

The second terminal device 30 compares the first evaluation value kijM with the second evaluation value k'ijM (step 74). If the first evaluation value kijM is equal to the second evaluation value k'ijM, the second terminal device outputs a verification result that indicates that the digital signature diM was signed by the signer i for the identification code m of digital data M (step 75), otherwise the second terminal device outputs another verification result that the digital signature diM was not signed by the signer i for the digital data (step 76).

As an application of the present embodiment, a digital signature system can be used for identification of a credit-card holder in on-line shopping using a credit card on the Internet. In on-line shopping using a credit card, a credit-card holder who wants to buy a goods from a shop needs to show an electronic proof which indicates that the credit-card holder wants to buy the goods from the shop. In order to fulfill this requirement, a credit-card company operates the center, and issues an inherent signing-key for each credit-card holder, as a signer, and an inherent verification-key for each shop keeper, as a verifier. Then, in a first terminal device which is located in the home of the credit-card holder, the credit-card holder generates a digital signature for a digital document which indicates the content of a payment (a credit-card number, an identification code of the goods, the number of the goods, etc.) using the credit-card holder's signing-key and transmits the name of the credit-card holder, the digital signature and the digital document to the shop through the Internet. On receiving the name of the credit-card holder the digital signature and the digital document, in a second terminal device which is located in the shop, the shop keeper verifies the validity of the digital signature using the shop's verification-key, the credit-card holder's identification code, the digital data. By the digital signature, the shop can determine if the digital document was generated by the credit-card holder or not. In present application, unforgettability of the digital signature can be realized based on no computationally hard problem, or based on the security of the underlying hash function to compress the digital document.

What is claimed is:

1. A center computer in a digital signature system, comprising:
   first generating means for generating a signing-key for a signer;
   second generating means for generating a verification-key for a verifier;
   a first output device outputting the signing-key generated by the first generating means; and
   a second output device outputting the verification-key generated by the second generating means, wherein:
      the first generating means comprises means for generating a first multivariate function, and means for generating a second multivariate function obtained by substituting the signer's identification code into a first variable of the first multivariate function;
      the first output device outputs the second multivariate function as the signing-key for the signer;
      the second generating means comprises means for generating a random number, a third multivariate function obtained by substituting the random number to a second variable of the first multivariate function; and
      the second output device outputs the random number and the third multivariate function as the verification-key for the verifier.

2. The center computer according to claim 1, wherein:
   the second multivariate function is generated by substituting the signer's identification code into a first group of variables of the first multivariate function.

3. The center computer according to claim 1, wherein:
   a group of random numbers is generated and the third multivariate function is generated by substituting the group of random numbers into a second group of variables of the first multivariate function; and
   the group of random numbers and the third multivariate function are outputted as the verification-key for the verifier.

4. A method of establishing a signing-key for a signer and a verification-key for a verifier, said method comprising:
   in a computer of a digital signature system,
      generating a first multivariate function;
      generating a second multivariate function obtained by substituting a signer's identification code into a first variable of the first multivariate function;
      outputting the second multivariate function as a signing-key for the signer;
      generating a random number, a third multivariate function obtained by substituting the random number into a second variable of the first multivariate function; and
      outputting the random number and the third multivariate function as a verification-key for the verifier.

5. A computer readable recording medium having a program recorded thereon, the program controlling the computer so as to:
   generate a first multivariate function;
   generate a second multivariate function obtained by substituting a signer's identification code into a first variable of the first multivariate function;
   output the second multivariate function as a signing-key for the signer;
   generate a random number, a third multivariate function obtained by substituting the random number to a second variable of the first multivariate function; and
   output the random number and the third multivariate function as a verification-key for a verifier.

6. The computer readable recording medium according to claim 5, wherein the program controls the computer so as to:
   generate the second multivariate function by substituting the signer's identification code into a first group of variables of the first multivariate function; and
   output the second multivariate function as a signing-key for the signer.

7. The computer readable recording medium according to claim 5, wherein the program controls the computer so as to:
   generate a group of random numbers and generate a third multivariate function by substituting the group of random numbers into a second group of variables of the first multivariate function; and
   output the group of random numbers and the third multivariate function as a verification-key for the verifier.

8. A method of establishing a digital signature in a digital signature system comprising a center computer and a first and second terminal devices which can communicate with each other, comprising:
   in the center computer,
      generating a first multivariate function,
      generating a second multivariate function obtained by substituting a signer's identification code into a first variable of the first multivariate function,
      outputting the second multivariate function as a signing-key for the signer,
      generating a random number, a third multivariate function obtained by substituting the random number into a second variable of the first multivariate function; and
      outputting the random number and the third multivariate function as a verification-key for a verifier;
   in the first terminal device,
      accepting the signer's signing-key;
      inputting the accepted signer's signing-key;
      inputting an identification code of a digital data;

generating a fourth multivariate function obtained by substituting the identification code of the digital data into the third variable of the second multivariate function; and outputting the fourth multivariate function as a digital signature;

in the second terminal device, accepting the verification-key, inputting the accepted verifier's verification-key, accepting an identity of the signer, inputting the signer's identification code, accepting the identification code of the digital data, inputting the accepted identification code of the digital data, accepting the digital signature, inputting the accepted digital signature, generating a first evaluation value by substituting the random number into the second variable of the fourth multivariate function, generating a second evaluation value by substituting the signer's identification code and the identification code of the digital data into the first and third variables of the third multivariate function, respectively, and accepting the digital signature as valid if both of the first and second evaluation values equal, and otherwise rejecting the digital signature as invalid.

9. A first terminal device in a digital signature system, comprising:

accepting means for accepting a signer's signing-key;

a first input device inputting the signer's signing-key;

a second input device inputting an identification code of a digital data;

generating means for generating a digital signature; and an output device outputting the digital signature generated by the generating means, wherein:

the digital signature generating means generates a fourth multivariate function obtained by substituting an identification code of a digital data into a third variable of a second multivariate function; and the output device outputs the fourth multivariate function as the digital signature.

10. The first terminal device according to claim 9, wherein:

the digital signature generating means generates a fourth multivariate function by substituting an identification code of a digital data into a third group of variables of a second multivariate function; and the output device outputs the fourth multivariate function as the digital signature.

11. A method of establishing a digital signature comprising:

in a terminal device of a digital signature system, accepting a signer's signing-key;

inputting the accepted signer's signing-key;

inputting an identification code of a digital data;

generating a fourth multivariate function of a plurality of multivariate functions obtained by substituting the identification code of the digital data into a third variable of a second multivariate function; and outputting the fourth multivariate function as a digital signature.

12. The method of establishing a digital signature according to claim 11, wherein:

a fourth multivariate function is generated by substituting an identification code of a digital data into a third group of variables of a second multivariate function; and the fourth multivariate function is outputted as a digital signature.

13. A computer readable recording medium having a program recorded thereon, the program controlling a computer so as to:

accept an inputted signer's signing-key;

accept an inputted identification code of a digital data;

generate a fourth multivariate function of a plurality of multivariate functions obtained by substituting the identification code of the digital data into a third variable of a second multivariate function; and output the fourth multivariate function as a digital signature.

14. The computer readable recording medium according to claim 13, wherein the program controls the computer so as to:

generate the fourth multivariate function by substituting the identification code of the digital data into a third group of variables of the second multivariate function; and output the fourth multivariate function as a digital signature.

15. A second terminal device in a digital signature system comprising:

first accepting means for accepting a verification-key;

a first input device inputting a verifier's verification-key;

second accepting means for accepting a signer's identity;

a second input device inputting the signer's identification code;

third accepting means for an identification code of a digital data;

a third input device inputting the identification code of the digital data;

fourth accepting means for accepting a digital signature;

a fourth input device inputting the digital signature;

verifying means for verifying a validity of the digital signature using the verification-key, the signers identification code and the identification code of the digital data;

an output device outputting the result of verifying the validity of the digital signature, namely, acceptable as valid or not, wherein the verifying means for verifying the validity of the digital signature:

generates a first evaluation value by substituting a random number and a second variable of a fourth multivariate function of a plurality of multivariate functions;

generates a second evaluation value by substituting the signer's identification code and the identification code of the digital data into a first variable and a third variable of a third multivariate function, respectively; and accepts the digital signature as valid if both of the first and second evaluation values equal, and otherwise rejects the digital signature as invalid.

16. The second terminal device according to claim 15, wherein a first evaluation value is generated by substituting a group of random numbers into a second group of variables of the fourth multivariate function.

17. The second terminal device according to claim 15, wherein the signer's identification code is substituted into a first group of variables of the third multivariate function, or the identification code of the digital data is substituted into a third group of variables of the third multivariate function.

18. A method of verifying the validity of a digital signature comprising:

in a terminal device of a digital signature system,
accepting a verifier's verification-key;
inputting the accepted verification-key;
accepting a signer's identity;
inputting the signer's identification code;
accepting an identification code of a digital data;
inputting the identification code of the digital data;
accepting a digital signature;
inputting the digital signature;
generating a first evaluation value by substituting a random number into a second variable of a fourth multivariate function of a plurality of multivariate functions;
generating a second evaluation value by substituting the signer's identification code and the identification code of the digital data into a first variable and a third variable of a third multivariate function, respectively; and
accepting the digital signature as valid if both of the first and second evaluation values equal, and otherwise rejecting the digital signature as invalid.

19. A computer readable recording medium having a program recorded thereon, the program controlling the computer so as to:

accept an inputted verifiers verification-key;
accept an inputted signer's identification code;
accept an inputted identification code of a digital data;
accept an inputted digital signature;
generate a first evaluation value by substituting a random number into a second variable of a fourth multivariate function of a plurality of multivariate functions;
generate a second evaluation value by substituting the signer's identification code and the identification code of the digital data into a first variable and a third variable of a third multivariate function, respectively; and
accept the digital signature as valid if both of the first and second evaluation values equal, and otherwise reject the digital signature as invalid.

20. The computer readable recording medium according to claim 19, wherein the program controls the computer so as to generate a first evaluation value by substituting a group of random numbers into a second group of variables of the fourth multivariate function.

21. The computer readable recording medium according to claim 19, wherein the program controls the computer so as to substitute the signer's identification code into a first group of variables of the third multivariate function, or substitute the identification code of the digital data into a third group of variables of the third multivariate function.

* * * * *